(12) United States Patent
Sakamoto

(10) Patent No.: US 7,619,760 B2
(45) Date of Patent: Nov. 17, 2009

(54) IMAGE PROCESSING APPARATUS AND IMAGE PROCESSING METHOD THAT INTERRUPTS DELETION AND OVERWRITES IMAGE DATA

(75) Inventor: Takashi Sakamoto, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 942 days.

(21) Appl. No.: 10/868,929

(22) Filed: Jun. 17, 2004

(65) Prior Publication Data

US 2005/0111038 A1    May 26, 2005

(30) Foreign Application Priority Data

Nov. 21, 2003 (JP) ............................. 2003-392603

(51) Int. Cl.
*G06F 15/00* (2006.01)
*G06K 1/00* (2006.01)
*G06K 15/00* (2006.01)

(52) U.S. Cl. .................... 358/1.14; 358/1.16; 358/1.17

(58) Field of Classification Search ................ 358/1.13, 358/468, 453, 1.16, 1.14
See application file for complete search history.

(56) References Cited

U.S. PATENT DOCUMENTS

| | | | | |
|---|---|---|---|---|
| 6,023,716 | A | * | 2/2000 | Fujita et al. .................. 715/201 |
| 6,661,527 | B1 | * | 12/2003 | Shibao ....................... 358/1.13 |
| 7,516,102 | B2 | * | 4/2009 | Takamine .................... 705/51 |
| 2003/0025930 | A1 | * | 2/2003 | Tateyama .................. 358/1.14 |

FOREIGN PATENT DOCUMENTS

| | | |
|---|---|---|
| JP | A 09-164733 | 6/1997 |
| JP | A-9-223061 | 8/1997 |
| JP | A-9-284572 | 10/1997 |
| JP | A-11-143658 | 5/1999 |
| JP | A 2003-32484 | 1/2003 |
| JP | A 2003-37719 | 2/2003 |
| JP | A 2003-039751 | 2/2003 |
| KR | 2003-084791 | 11/2003 |

* cited by examiner

*Primary Examiner*—Douglas Q Tran
(74) *Attorney, Agent, or Firm*—Oliff & Berridge, PLC

(57) ABSTRACT

An image processing apparatus includes an image input unit that inputs image data, a storage unit that stores the image data inputted by the image input unit, an image output unit that reads the image data from the storage unit to output the read image data, and a data deleting controller that controls a deleting operation of the image data stored in storage unit based upon a condition of an acceptance of a next job.

4 Claims, 14 Drawing Sheets

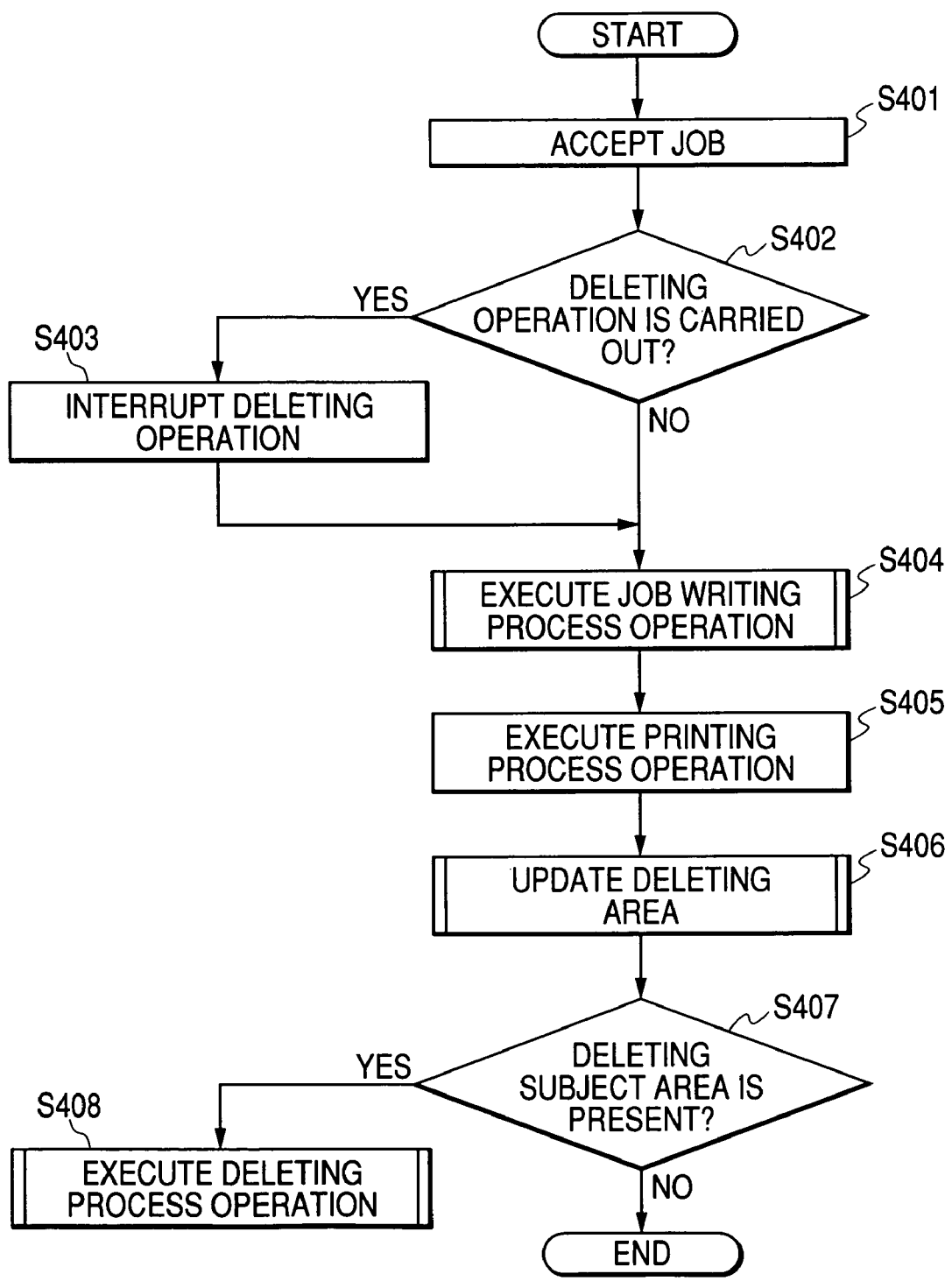

FIG. 7A
FIG. 7B
FIG. 7C
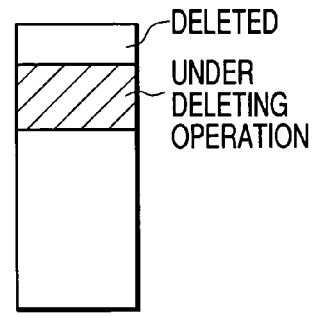
FIG. 8
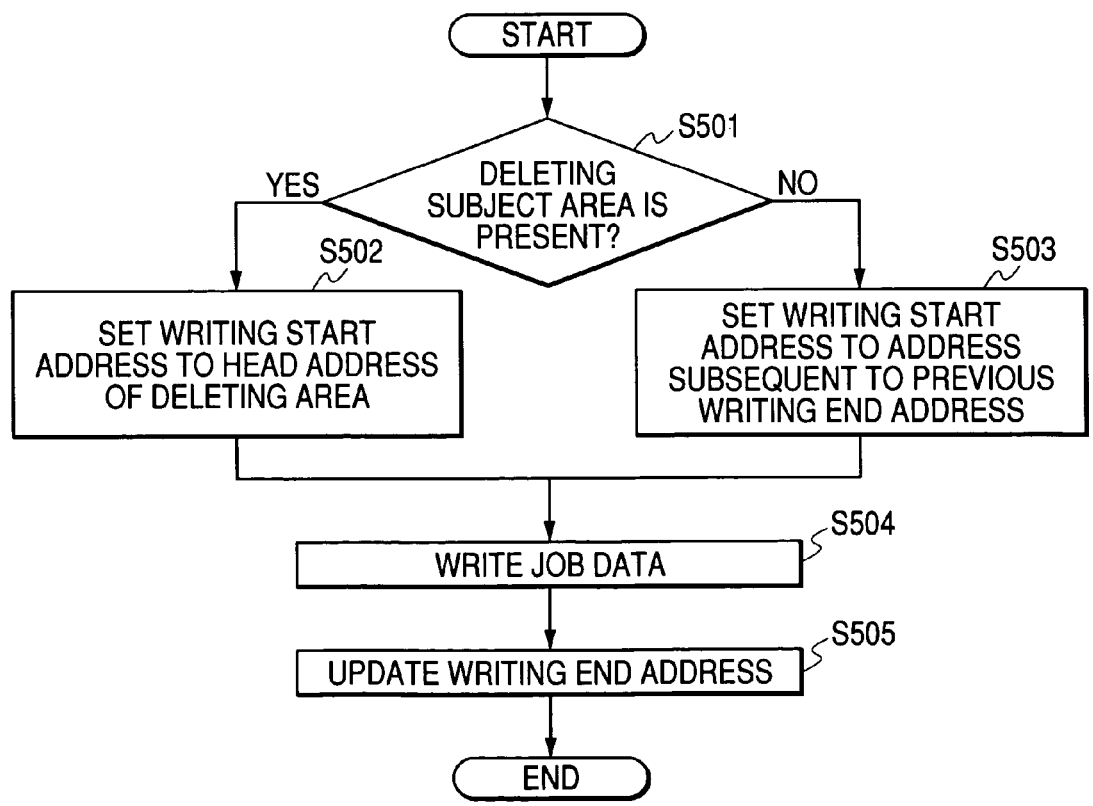

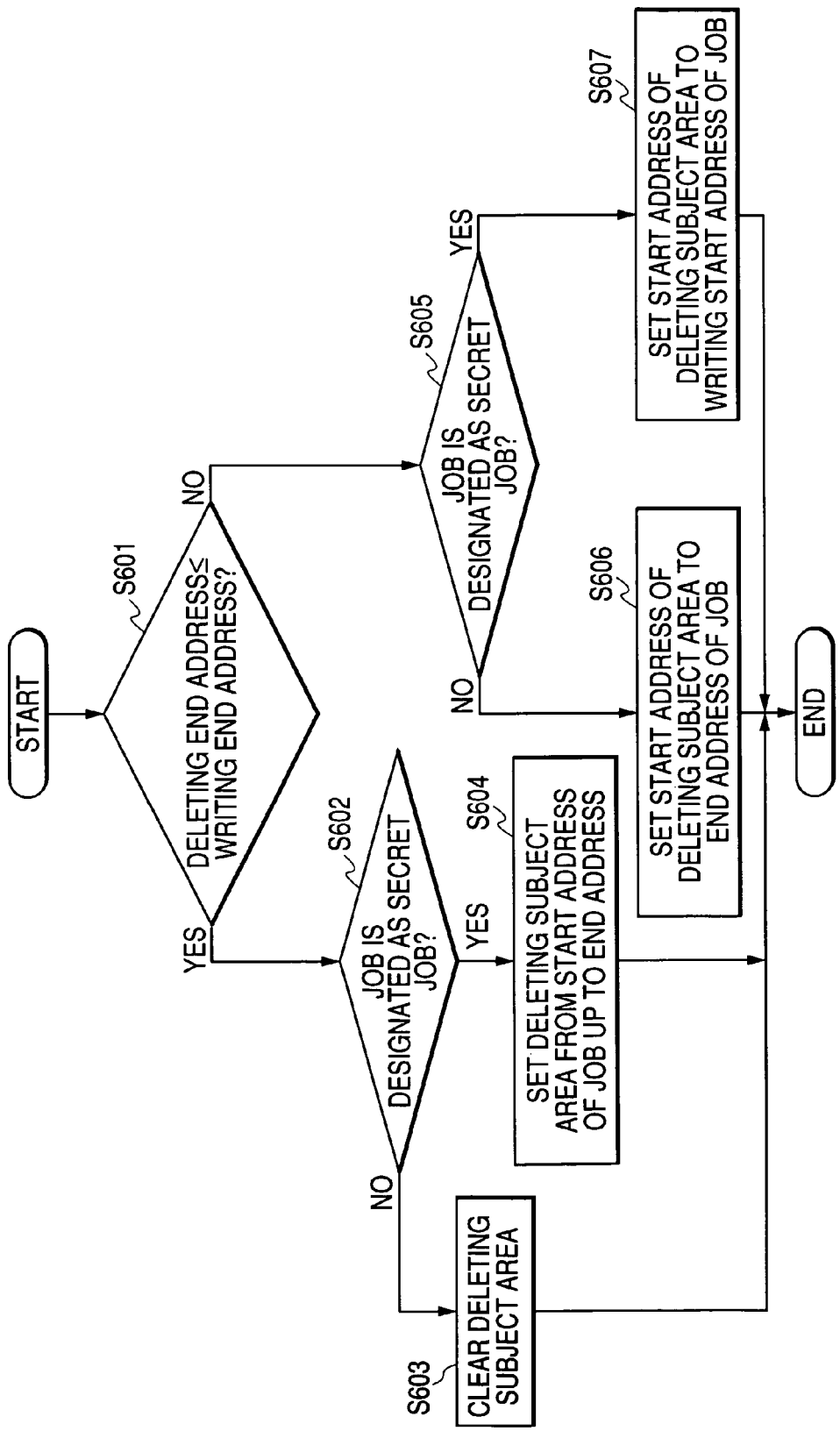

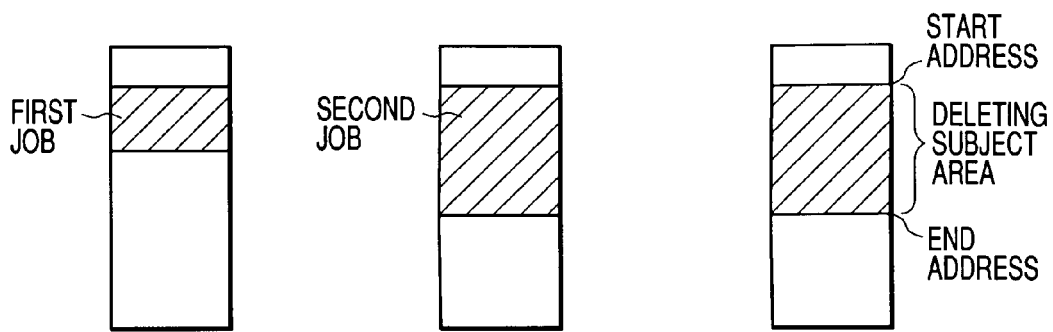
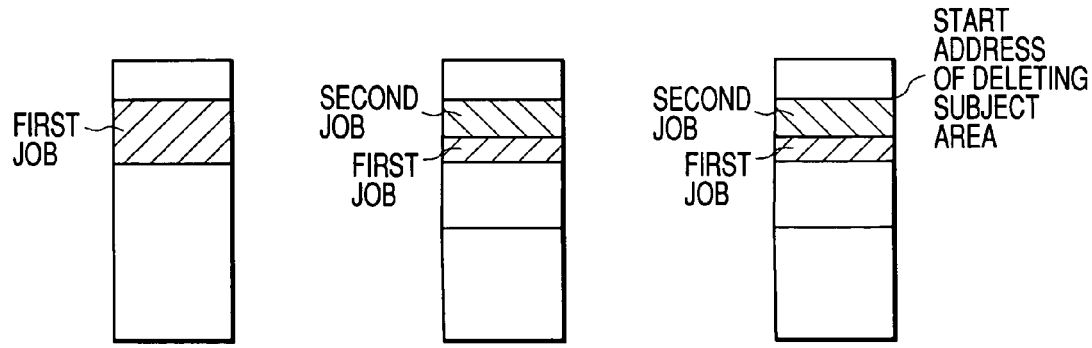

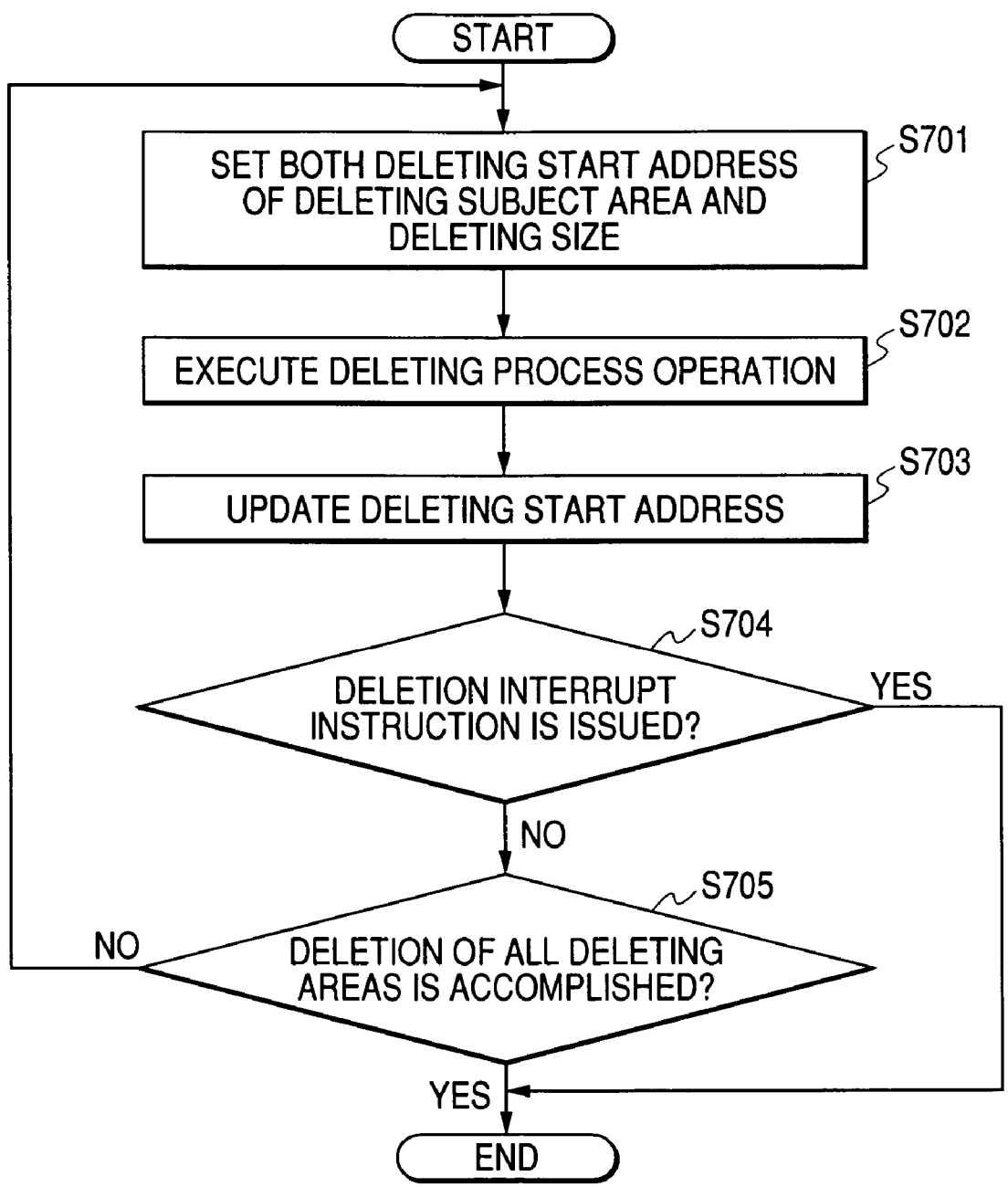

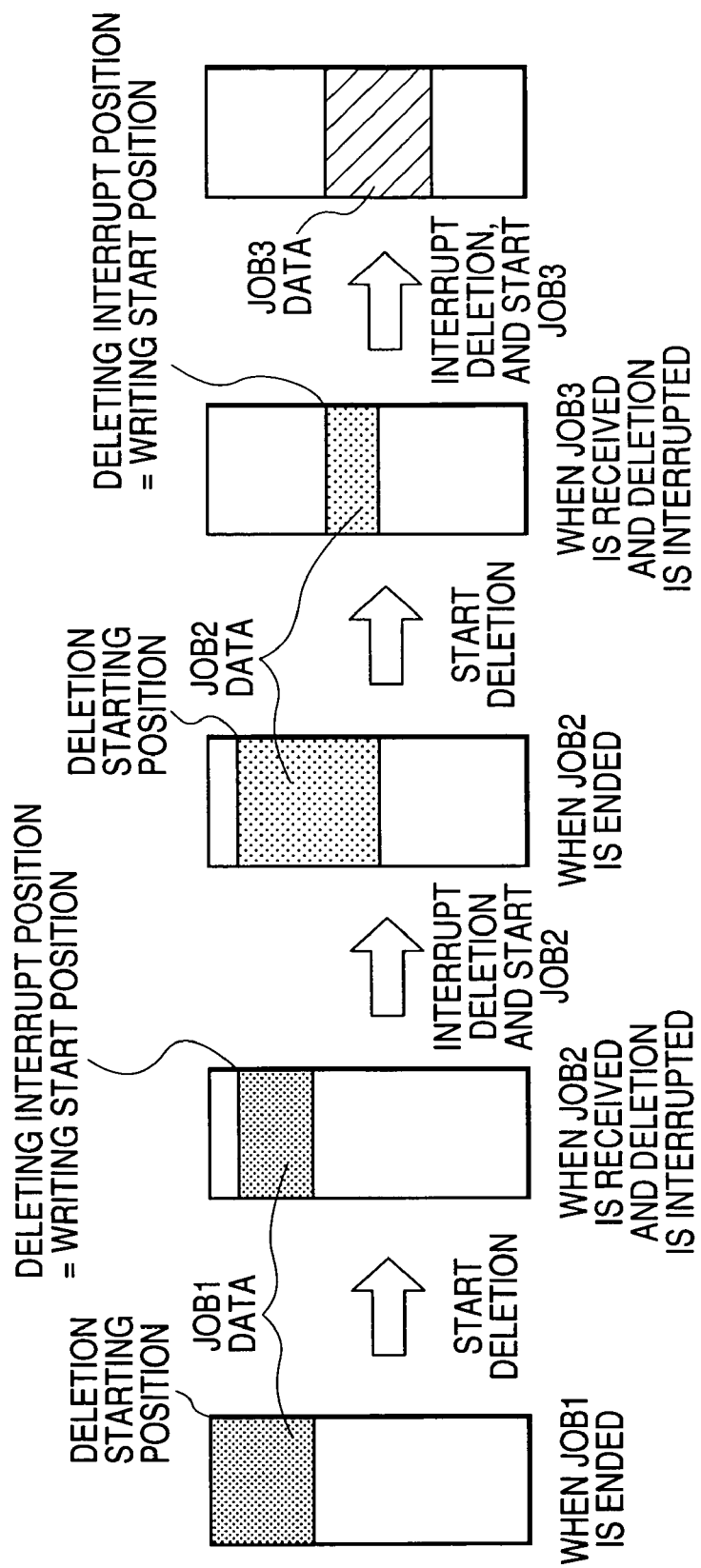

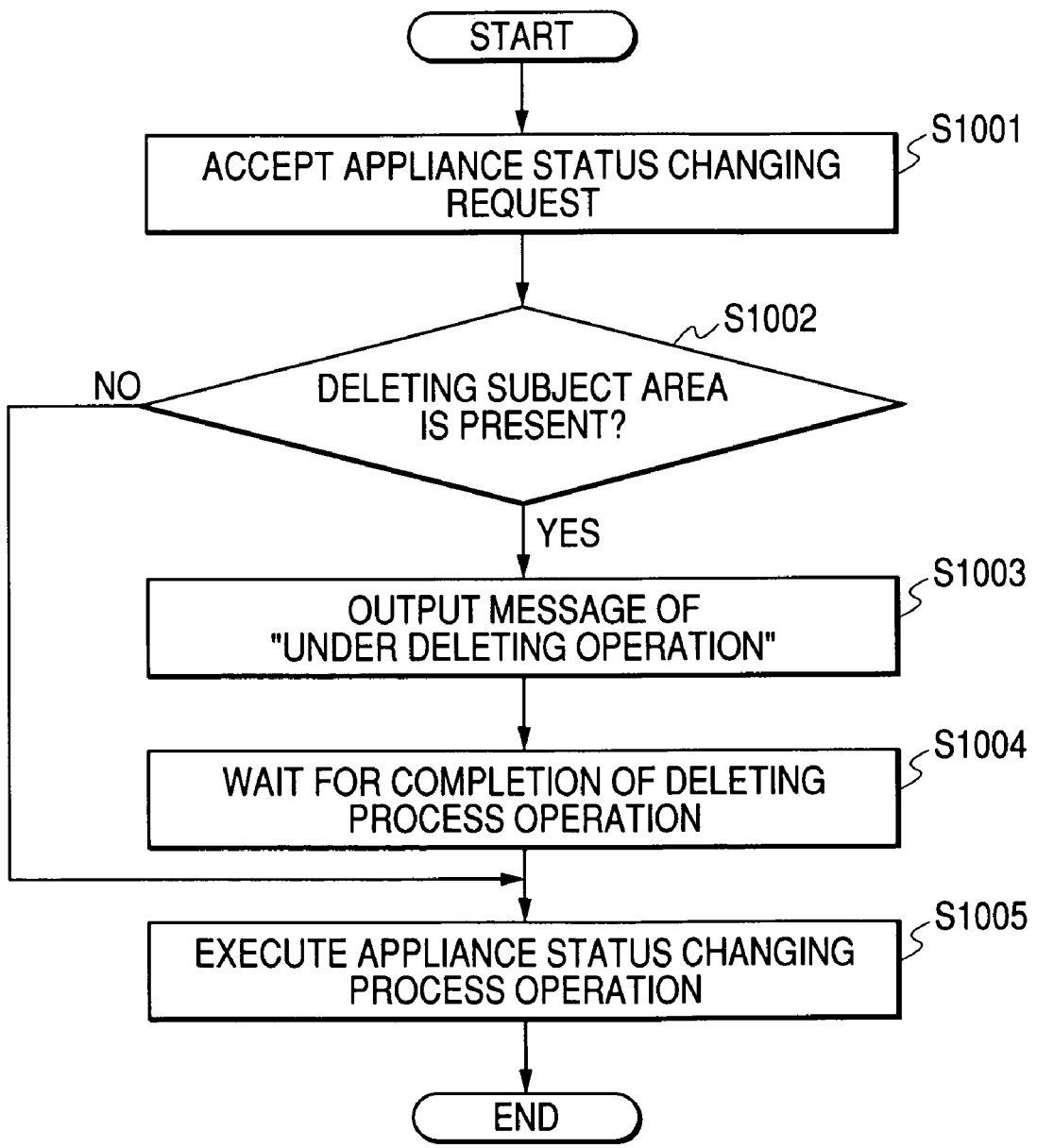

IMAGE PROCESSING APPARATUS AND IMAGE PROCESSING METHOD THAT INTERRUPTS DELETION AND OVERWRITES IMAGE DATA

BACKGROUND OF THE INVENTION

1. Field of the Invention

The present invention is related to an image processing apparatus and an image processing program, which is equipped with a non-volatile storage apparatus such as a hard disk drive (HDD) having a large storage capacity, for storing thereinto either image data of an original read by an image reading apparatus or image data transmitted via a communication line such as a LAN in an image forming apparatus such as a copying machine, a printer, a facsimile machine, or a multifunction machine of these electronic appliances, to which an electrophotographic system has been applied. More specifically, the present invention is directed to an image processing apparatus and an image processing program, which are capable of deleting in a higher efficiency image data stored in a non-volatile storage apparatus having a large storage capacity such as a hard disk drive (HDD), while higher productivity is maintained.

2. Description of the Related Art

As this sort of image forming apparatus such as a copying machine, a printer, a facsimile machine, or a multifunction machine of these electronic appliances, to which an electrophotographic system has been applied, it is known to provide digital copying machines and digital multifunction machines. In these digital copying machines and digital multifunction machines, while either image data of originals read by image reading apparatus or image data transmitted via communication lines such as LAN are temporarily stored into non-volatile storage apparatus having large storage capacities such as hard disk drives (HDDs), the image data stored in the hard disk drives (HDDs) are properly read out, and after a predetermined image processing operation is carried out with respect to this read image data, either black/white images or images in a full color mode are printed. In such image forming apparatus, even when printing operations are accomplished, the image data are brought into such a condition that the image data still remain stored in the hard disk drives (HDDs).

Also, even in such a case that the image data stored in the above-described hard disk drives (HDDs) are erased, in accordance with a general-purpose data deleting method, management information of data is normally and merely erased, but the image data per se are brought into such a condition that these image data are left in the storage areas of the hard disk drives (HDDs) where the image data have been stored until any other data are overwritten with these storage areas.

As a consequence, in such a case that under such a condition that the image data remains stored in the above-explained image forming apparatus, the hard disk drive (HDD) is dismounted in a certain way, $_{13}$ and then, the data stored in this hard disk drive (HDD) is read out, or the data stored in the hard disk is read out via either a network or an external interface, there are some possibilities that such an information which has been stored in the hard disk drive (HDD) is analyzed so as to restore the image data. Thus, there is a certain risk that the analyzed information is leaked from the image forming apparatus. As a result, in the case that confidential information such as secret information for a third party is handled in the above-explained image forming apparatus, measures with respect to an information leak problem must be taken.

SUMMARY OF THE INVENTION

According to an aspect of the invention, an image processing apparatus includes an image input unit that inputs image data, a storage unit that stores the image data inputted by the image input unit, an image output unit that reads the image data from the storage unit to output the read image data, and a data deleting controller that controls a deleting operation of the image data stored in storage unit based upon a condition of an acceptance of a next job.

According to another aspect of the invention, an image processing method includes the steps of inputting image data, storing the inputted image data, outputting the stored image data, and controlling a deleting process operation of the stored image data based upon a condition of an acceptance of a next job.

BRIEF DESCRIPTION OF THE DRAWINGS

Preferred embodiment of the present invention will be described in detail based on the following figures, wherein:

FIG. 6 is a flow chart for describing operation of the image processing apparatus according to the embodiment mode 1 of the present invention;

FIGS. 7A to 7C are explanatory diagrams for explaining a storage area of the hard disk drive;

FIG. 8 is a flow chart for describing operation of the image processing apparatus according to the embodiment mode 1 of the present invention;

FIG. 11 is a flow chart for describing operation of the image processing apparatus according to the embodiment mode 1 of the present invention;

FIGS. 12A to 12C are explanatory diagrams for explaining a storage area of the hard disk drive;

FIGS. 13A to 13C is an explanatory diagram for indicating a storage area of the hard disk drive;

FIG. 14 is a flow chart for describing operation of the image processing apparatus according to the embodiment mode 1 of the present invention;

FIG. 15 is an explanatory diagram for explaining a storage area of the hard disk drive;

FIG. 18 is a flow chart for explaining operation of the image processing apparatus according to the embodiment mode 2 of the present invention.

DETAILED DESCRIPTION OF THE INVENTION

Referring now to drawings, a description is made of preferred embodiments of the present invention.

Figure 2:
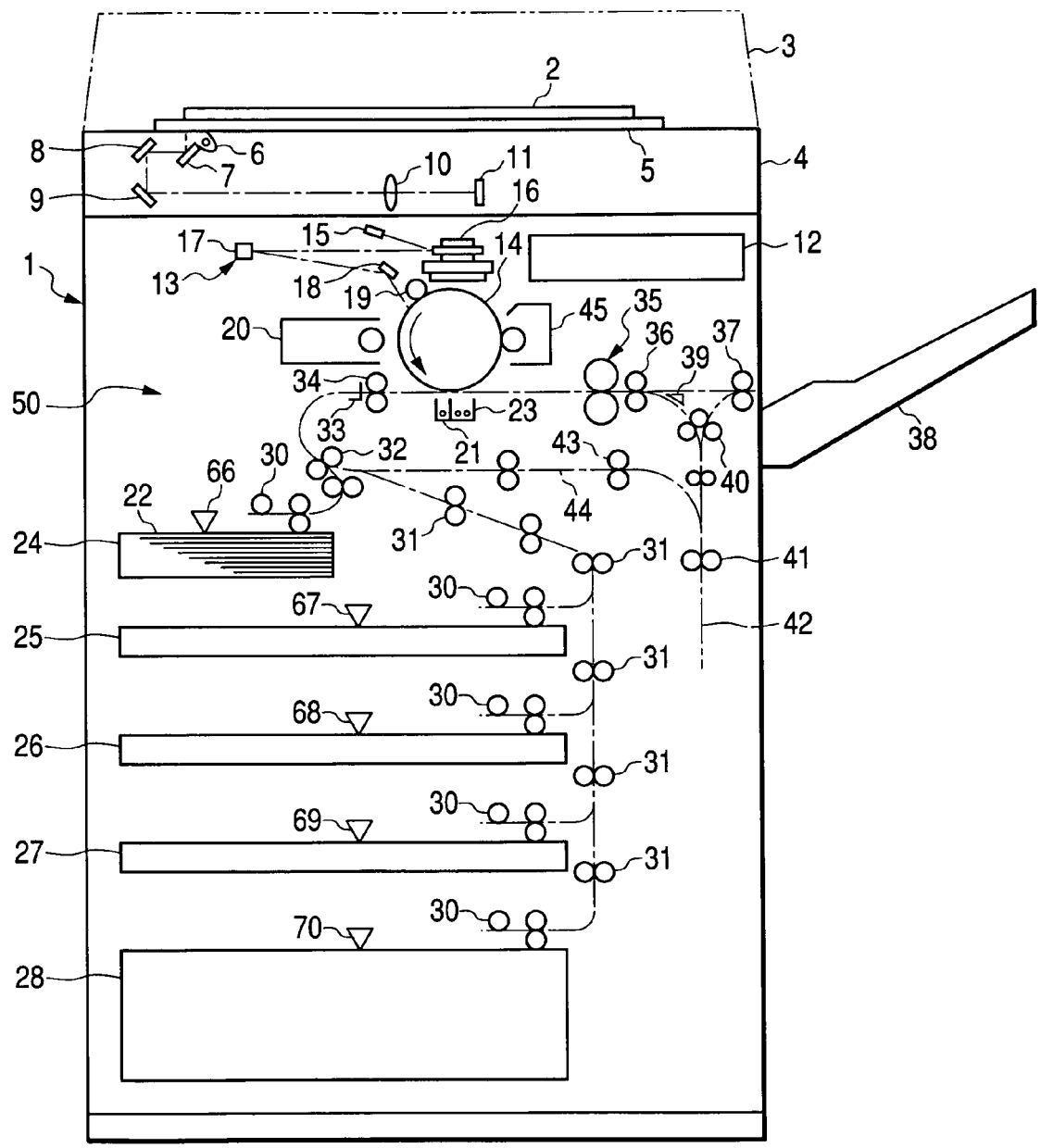
FIG. 2 is a structural diagram for indicating a digital multifunction machine to which the image processing apparatus according to the embodiment mode 1 of the present invention has been applied.

FIG. 2 illustratively shows a construction of a digital multifunction machine functioning as an image forming apparatus to which an image processing apparatus according to a first embodiment of the present invention has been applied. This digital multifunction machine is arranged in such a manner that the digital composite apparatus can execute an operation in response to a switched mode, while the digital multifunction machine selectively switches a copy mode, a print mode, and a FAX mode. In the copy mode, an image of an original is read by an image reading apparatus, and then, the image of the original read by this image reading apparatus is copied. In the print mode, an image is printed based upon image data transmitted from a host computer, or the like, such as a personal computer. In the FAX mode, an image of an original is read by using an image reading apparatus to transmit the read image data of the original, or image data transmitted via a telephone line is printed.

In FIG. 2, reference numeral 1 shows a main body of the digital multifunction machine. Both an auto document feeder (ADF) 3 and an image reading apparatus 4 are arranged in an upper portion of the main body 1 of this digital multifunction machine. The auto document feeder 3 automatically transports an original 2 under such a condition that these plural originals 2 are separated one sheet by one sheet. The image reading apparatus 4 reads an image of the original 2 transported by the auto document feeder 3. As indicated in FIG. 2, the image reading apparatus 4 is constituted as follows. That is, the original 2 mounted on a platen glass 5 is illuminated by a light source 6, and then, a reflection light image reflected from the original 2 is scanned/exposed via an image compressing optical system onto an image reading element 11 so as to be optically read. The image reducing optical system is constituted by a full rate mirror 7, half rate mirrors 8 and 9, and further, an imaging lens 10.

Also, an internal unit of the main body 1 of the above-explained digital multifunction machine is arranged in order to mainly function as a printer 50. This printer 50 may also function as an image output terminal for forming an image on a paper not only in the print mode, but also in the copy mode and the FAX mode.

The image data of the original 2 read by the image processing apparatus 4 and/or the image data transmitted via the telephone line is once stored in a hard disk drive (HDD) functioning as a non-volatile storage apparatus of an image processing apparatus 12 according to this embodiment 1, and a predetermined image processing operation is carried out thereto, if necessary, and thereafter, the image data to which this image processing operation has been executed is sent to a printer 50.

In the printer 50, an image is exposed on a photosensitive drum 14 by an ROS (Raster Output Scanner) 13 in response to the image data to which the image process operation has been performed, so that an electrostatic latent image is formed. The above-explained ROS 13 is constituted by a semiconductor laser 15, a polygon mirror 16, and mirrors 17 and 18. The semiconductor laser 15 emits a laser beam in response to image information. The polygon mirror 16 scans the laser beam emitted from the semiconductor laser 15. The mirrors 17 and 18 expose such a laser beam scanned by the polygon mirror 16 on the photosensitive drum 14. The photosensitive drum 14 is uniformly charged at a predetermined potential of a predetermined polarity by a primary charging device 19 constructed of a charging roller, corotron, and the like, prior to the image expositing operation by the ROS 13. Thereafter, as previously explained, the image of the original 2 is exposed to this charged photosensitive drum 14 by the ROS 13, so that an electrostatic latent image is formed. The electrostatic latent image formed on the photosensitive drum 14 is developed by a developing apparatus 20 so as to become a toner image. This toner image is transferred into a recording paper 22 functioning as a recording medium by being charged by a transfer corotron 21, and also, the recording paper 22 to which this toner image has been transferred is separated from the photosensitive drum 14 by a discharge operation by a separating corotron 23. The recording paper 22 to which the toner image has been transferred from the photosensitive drum 14 is supplied by a paper supply roller 30 from any one of paper supply trays 24, 25, 26, 27, 28, and is once transported up to a registration gate 33 via a transport roller 31 and a pre-registration roller 32, and then is stopped. The paper supply trays 24, 25, 26, 27, and 28 are provided inside the main body 1 of the digital copying machine as a paper supply unit. Then, the above-explained recording paper 22 passes through the registration gate 33, and is transported to a surface of the photosensitive drum 14 by a register roller 34. The registration gate 33 is opened in synchronism with the toner image formed on the surface of the photosensitive drum 14. The register roller 34 is arranged on the down stream side of this registration gate 33. As previously explained, after the toner image formed on the surface of this photosensitive drum 14 has been transferred to this transported recording paper 22, the resultant recording paper 22 is separated from the surface of the photosensitive drum 14.

In the above-described digital multifunction machine, while paper transport paths from the paper supply trays 24, 25, 26, 27, 28 are formed as short as possible, this digital multifunction machine may realize high productivity (namely, total sheet of copies per unit hour) by transporting the recording paper 22 in a high speed.

The recording paper 22 which has been separated from the surface of the photosensitive drum 14 is transported to a fixing apparatus 35, and then, the toner image is fixed on the recording paper 22 by this fixing apparatus 35 by way of either heat or pressure. The recording paper 22 on which this toner image has been fixed is directly ejected onto an ejection tray 28 provided outside the main body 1 of this digital multifunction machine by an exit roller 36 of the fixing apparatus 35 and by an ejection roller 37 in the case that the normal simplex copying operation is carried out. Also, in the case that the duplex copying operation is carried out, such a recording paper 22 in which the toner image has been fixed to the single plane is not directly ejected outside the main body 1 by the ejection roller 37, but the transport direction is changed to a lower direction by an inverting gate 39, and then, this recording paper 22 is once transported to an inversion path 42 by a tri-roller 40 and an inverting roller 41. In the tri-roller 40, three rollers are made contact to each other under pressure. Then, the above-explained recording paper 22 is transported to a path 44 for duplex copying operation by both the inverting roller 41 which is presently rotated along the opposite direction and a duplex roller 43. The recording paper 22 is once transported from this path 44 for duplex copying operation via a pre-register roller 32 up to the register gate 33, and then is stopped. As previously explained, the recording paper 22 is transported in synchronism with the toner image formed on the photosensitive drum 14 by this register gate 33 and the register roller 34, and a transfer/fixing step of the toner image is carried out, and thereafter, the recording paper 22 is ejected to the ejection tray 38 by the ejection roller 37.

It should be noted that as to the surface of the photosensitive drum 14 after the transfer step of the toner image has been accomplished, residual toners, paper powder, and the like are removed by a cleaning apparatus 45, and thus, this surface of the photosensitive drum 14 is prepared for the next image forming step.

Figure 3:
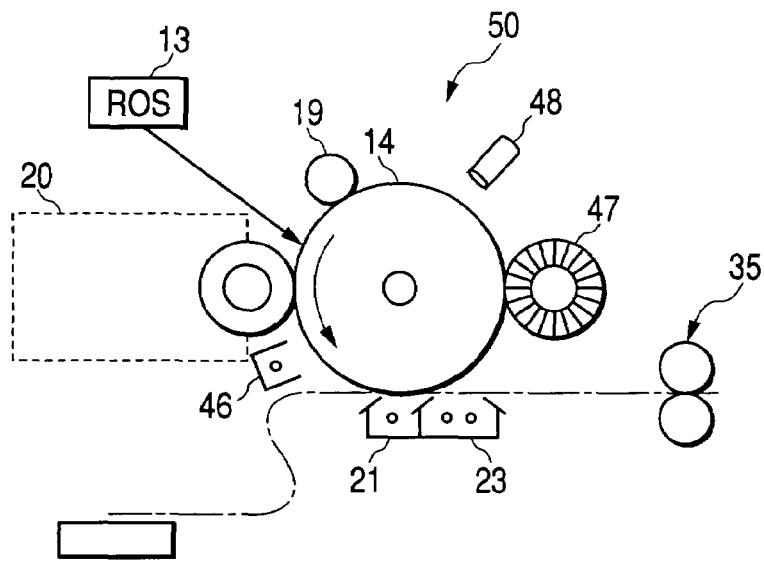
FIG. 3 is a structural diagram for indicating an image forming unit of the digital multifunction machine to which the image processing apparatus according to the embodiment mode 1 of the present invention has been applied.

FIG. 3 shows the image forming unit of the digital copying machine with employment of the above-described arrangement in an enlarge manner.

The photosensitive drum 14 is uniformly charged at a predetermined potential of a predetermined polarity by the primary charging device 19 constructed of the charging roller, or the corotron. Thereafter, the image of the original 2 is scanned and exposed to this charged photosensitive drum 14 by the ROS 13, so that an electrostatic latent image is formed. The electrostatic latent image formed on the surface of the photosensitive drum 14 is developed by the developing apparatus 20 so as to construct the toner image. After this toner image is auxiliary-charged by a pretransfer charging device 46, as previously explained, the auxiliary-charged toner image is transferred to the recording paper 22 which is supplied/transported from a desirable paper supply tray among the plural paper supply trays 24 to 29 by being charged by the transfer corotron 21. Also, the recording paper 22 to which this toner image has been transferred is separated from the surface of the photosensitive drum 14 by the electrical removing separation by the separating corotron 23. The recording paper 22 which has been separated from the surface of the photosensitive drum 14 is transported to the fixing apparatus 35 according to the embodiment of the present invention, and then, the toner image is fixed by this fixing apparatus 35. In the case of the single plane copying operation, the recording paper 21 on which the toner image has been fixed is directly ejected to the ejection tray 38, whereas in the case of the duplex copying operation, the image forming step is repeated with respect to the rear surface of this recording paper 22.

It should be understood that as to the surface of the photosensitive drum 14 after the transfer step of the toner image has been accomplished, the residual toners and the paper powder are removed by the cleaning brush 47 of the cleaning apparatus 44, and thereafter, this surface of the photosensitive drum 14 is exposed by an erase lamp 48, so that the residual electric charges may be erased, and the photosensitive drum 14 is prepared for the next image forming step.

Figure 4:
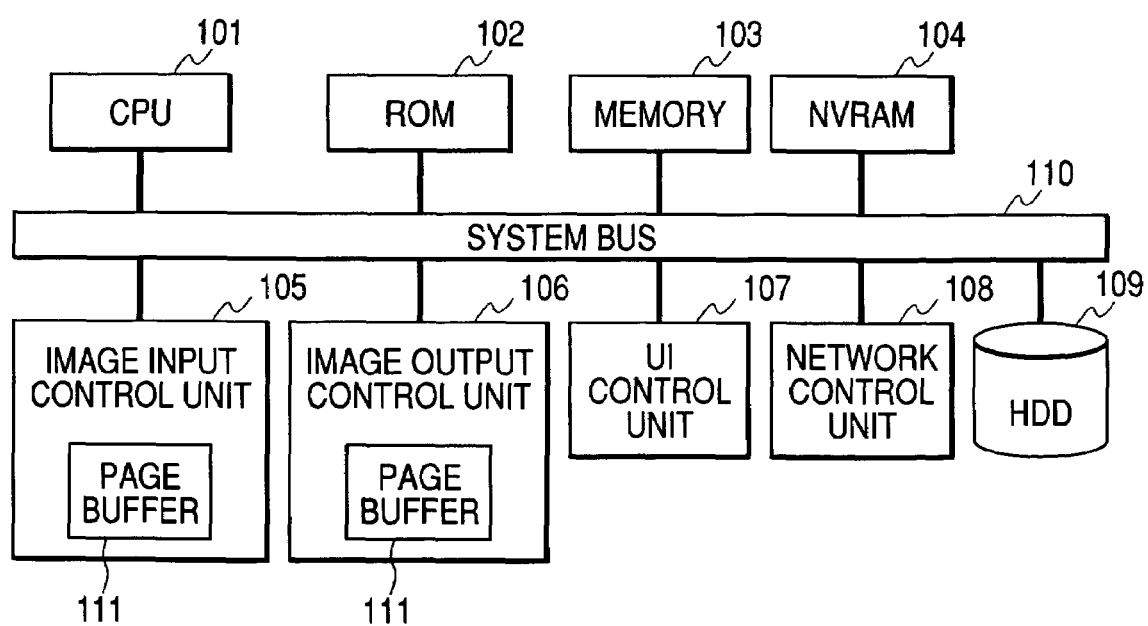
FIG. 4 is a structural diagram for representing a control circuit of the digital multifunction machine to which the image processing apparatus according to the embodiment mode 1 of the present invention has been applied.

FIG. 4 shows a control circuit of the digital multifunction machine containing the image processing apparatus according to the embodiment mode 1 of the present invention.

In FIG. 4, reference numeral 101 shows a CPU for controlling operations of the digital multifunction machine containing the image processing apparatus; reference numeral 102 indicates a ROM (Read-Only Memory) which stores thereinto a control program to be executed by the CPU 101, and an image processing program according to this embodiment mode 1; reference numeral 103 indicates a memory which stores thereinto a parameter and the like, which are used so as to execute a control operation by the CPU 101; reference numeral 104 represents an NVRAM which stores thereinto a parameter and the like, which are employed so as to execute a control operation by the CPU 101; reference numeral 105 shows an image input control unit functioning as an image input unit for controlling an input operation of an image; reference numeral 106 indicates an image output control unit functioning as an image output unit for controlling an output operation of an image; reference numeral 107 represents a user interface (UI) control unit for controlling a user interface (UI); reference numeral 108 denotes a network control unit for controlling a communication operation via a network to which the digital multifunction machine is connected; reference numeral 109 shows a hard disk drive (HDD) functioning as a non-volatile storage unit; and reference numeral 110 shows a system bus which connects the above-described CPU 101, ROM 102, and the like to each other; and also, reference numeral 111 indicates page buffers which are provided in both the image input control unit 105 and the image output control unit 106, and temporarily store thereinto image data in the unit of a page. The above-described multifunction machine is connectable via a network such as a LAN (Local Area Network) and a telephone line to a personal computer (not shown), the Internet, and the like by the network control unit 108.

The user interface (UI) connected to the above-described user interface (UI) control unit 107 is arranged as follows. That is, this user interface (UI) selects the print mode, the copy mode, the FAX mode, or the like, which is executed by the digital multifunction machine. In the case that the print mode, the copy mode, or the like is selected, this user interface (UI) selects a paper supply tray for supplying a paper to be printed, selects a total printing number, or selects magnification of a copying operation. Since a start button is depressed, the user interface (UI) starts a printing operation, or the like.

On the other hand, in this embodiment mode 1, the image processing apparatus is arranged by that in such an image processing apparatus equipped with an image input unit that inputs image data, a non-volatile storage unit that stores thereinto the image data inputted by the image input unit, and an image output unit that reads the image data from the non-volatile storage unit to output the read image data, the image processing apparatus includes a writing area managing unit that manages a writing area of the non-volatile storage unit, a deleting area managing unit that manages a deleting area of the non-volatile storage unit, a secret level input unit that inputs a secret level of the image data, and a data deleting control unit that controls a deleting operation of the image data stored in the non-volatile storage unit by managing both the writing area by the writing area managing unit and the deleting area by the deleting area managing unit in response to the secret level entered by the secret level input unit.

Also, in this embodiment mode 1, the image processing apparatus as claimed in claim 1, further includes a job control unit that controls a job for executing a process operation in the image processing apparatus. Preferably, the data deleting control unit controls the deleting operation based upon management information of the deleting area managing unit and an accepting condition of a next job by the job control unit.

Furthermore, in the embodiment mode 1, when the job control unit executes a second job while image data of a first job is being erased, the data deleting control unit interrupts a deleting process operation, and successively overwrites image data of the second job in an area on the non-volatile storage apparatus, the area being to be erased.

Also, in this embodiment mode 1, when an unerased portion of the first job is left after a writing operation of the image data of the second job is accomplished, the data deleting control unit executes the deleting process operation of the unerased portion.

Also, in this embodiment mode 1, the deleting area managing unit determines the deleting area based upon both the secret level entered by the secret level inputting unit and information managed by the writing area managing unit.

Also, in this embodiment mode 1, in the case that the data deleting control unit judges that a secret level of the second job entered by the secret level input unit is equal to, or higher than a secret level of the first job which has been executed in advance, the data deleting control unit executes a deleting operation of the second job with a top priority, even when the deleting area of the first job is left.

Figure 1:
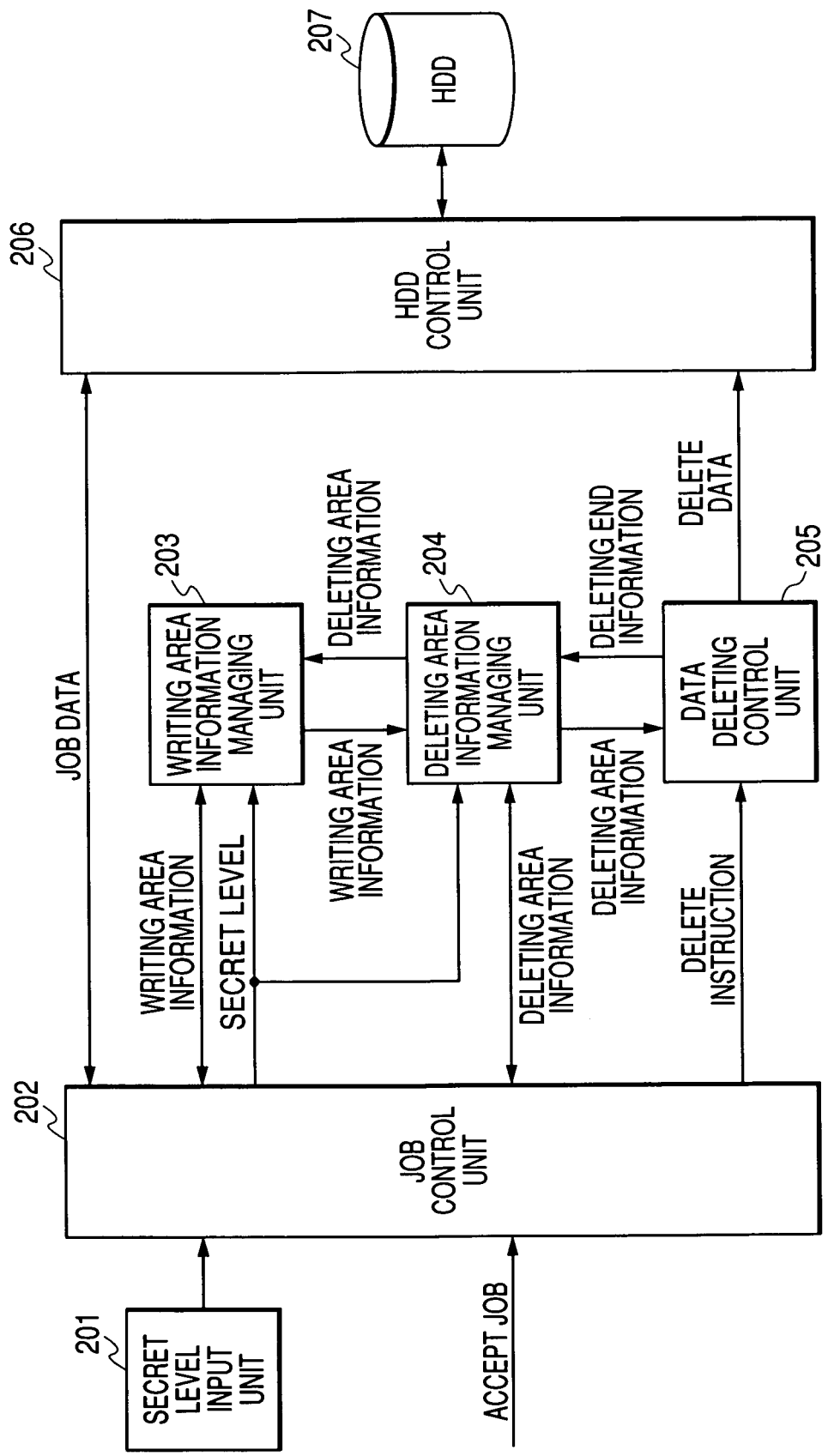
FIG. 1 is a block diagram for showing a function of an image processing apparatus according to an embodiment mode 1 of the present invention.

FIG. 1 is a block diagram for representing an internal arrangement of the image processing apparatus 12 according to this first embodiment of the present invention.

In FIG. 1, reference numeral 201 shows a secret level input unit that inputs a secret level of image data which should be processed by the image processing apparatus 12. This secret level input unit 201 is provided in, for example, the user interface of the digital multifunction machine, and is arranged by plural buttons for inputting a secret level, and an input screen of a printer driver. The printer driver is used to input the secret level, and is provided in a host computer constructed of a personal computer, or the like. In this case, as the secret levels entered by the above-explained secret level input unit, these secret levels are set to plural stages, for instance, "top secret", "high secret", "intermediate secret", "low secret", and so on.

A secret level signal entered from the secret level input unit 201 is sent to a job control unit 202 which manages a job for executing a process operation in the image processing apparatus 12. In this image control unit 202, such a job has been entered which has been inputted via the image input control unit 105, the network, or the like, and has been accepted. The job control unit 202 sends job data (image data) of the accepted job to a hard disk drive (HDD) control unit 206. This hard disk drive (HDD) control unit 206 controls a hard disk drive (HDD) 207 so as to write and erase the job data with respect to the hard disk drive (HDD) 207.

Also, as shown in FIG. 1, the above-described job control unit 202 transmits and receives writing area information between the own job control unit 202 and a writing area information managing unit 203. This writing area information managing unit 203 is arranged so as to manage the writing areas of the hard disk drive (HDD) 207. Furthermore, the secret level information is entered from the job control unit 202 into the writing area information managing unit 203.

Further, the above-described job control unit 202 transmits and receives deleting area information between a deleting area information managing unit 204 and the own job control unit 202, and the deleting area information managing unit 204 manages deleting areas of the hard disk drive (HDD) 207. Also, this deleting area information managing unit 204 transmits and receives both the writing area information and the deleting area information between the writing area information managing unit 203 and the own deleting area information managing unit 204 so as to manage the writing areas and the deleting areas. Furthermore, the secret level information has been inputted from the job control unit 202 also to the deleting area information managing unit 204.

Also, a deleting instruction has been entered from the job control unit 202 into a data deleting control unit 205 which controls the deleting operation with respect to the image data stored in the hard disk drive (HDD) 207. This data deleting control unit 205 outputs deleting data to a hard disk drive (HDD) control unit 206. Furthermore, the data deleting control unit 205 transmits and receives both the deleting area information and deleting end information between the deleting area information managing unit 204 and the own data deleting control unit 205.

It should also be noted that although different reference numeral 207 shown in FIG. 1 from reference numeral 109 indicated in FIG. 4 has been given to the hard disk drive (HDD), this hard disk drive (HDD) 207 of FIG. 1 is identical to the above-described hard disk drive (HDD) 109 of FIG. 4.

Figure 5:
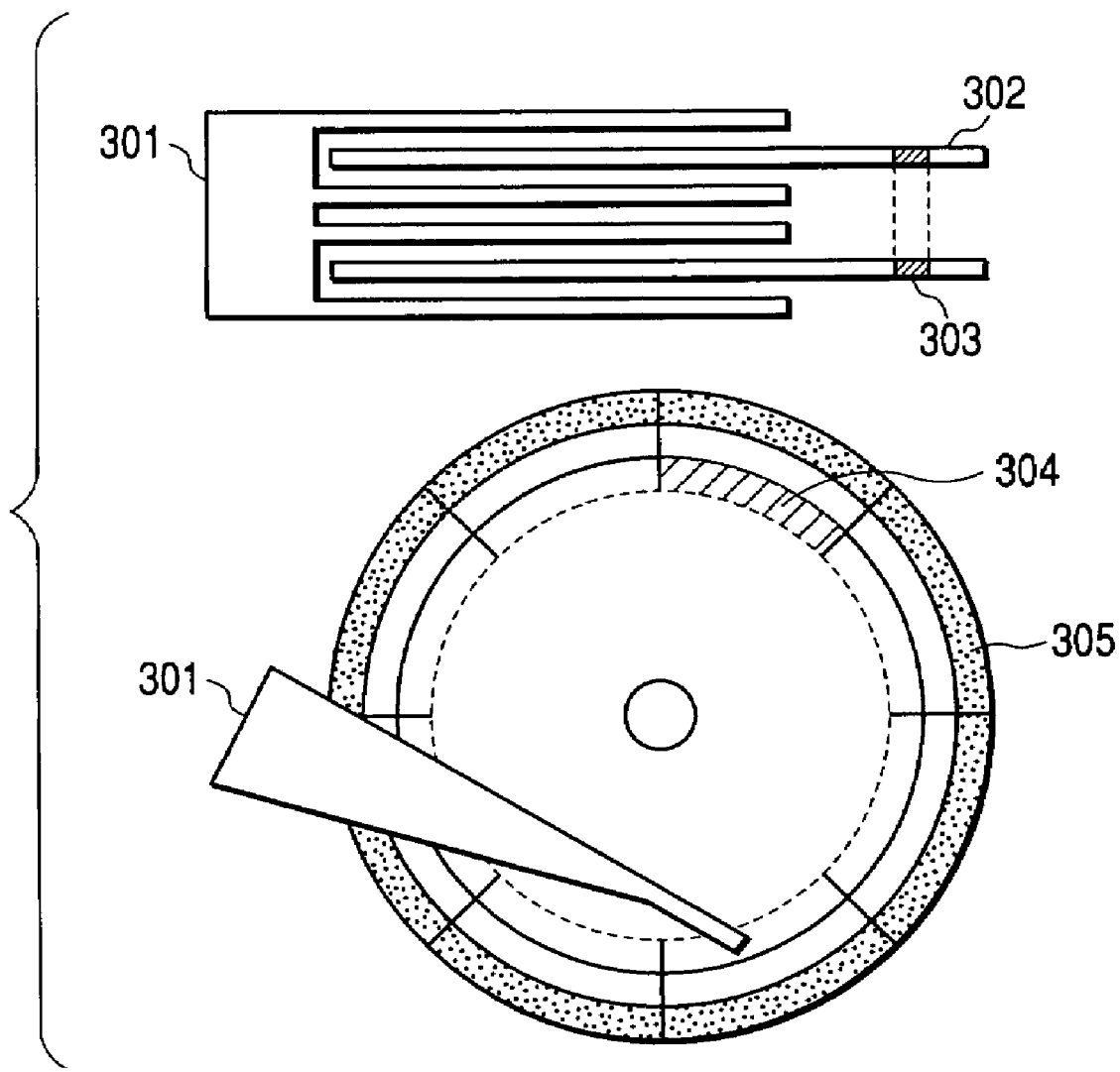
FIG. 5 is a structural diagram for showing a hard disk drive.

FIG. 5 is a structural diagram for indicating the hard disk drive 207 which is controlled by the above-explained hard disk control unit 206.

As indicated in FIG. 5, plural (two disks in this example) magnetic disks 302 are arranged in this hard disk drive (HDD) 207 in such a manner that these magnetic disks 302 are separated from each other by a predetermined distance along an axial direction in order to be rotated at a predetermined speed. Also, a magnetic head 301 for reading/writing data is arranged on both a front plane and a rear plane of two magnetic disks 302 in such a manner that this magnetic head 301 can be moved in an arc shape along a substantially radial direction of the magnetic disk 302. Furthermore, tracks 305 are provided on the surface of the magnetic disks 302, while these tracks 305 are subdivided into plural areas in a coaxial shape along the radial direction. Also, this track 305 is subdivided into plural sectors 304 along a circumferential direction. Two above-described magnetic disks 302 are arranged in such a manner that areas of the same tracks which correspond to each other along upper/lower directions may form a single cylinder 303.

Also, as an area managing method for managing storage areas of the hard disk drive (HDD) 207, both a CHS system and an LBA system are present. The CHS system corresponds to such a system for determining a position of data which should be stored based upon such parameters as Cylinder, Head, and Sector. Also, the LBA system is referred to as a Logical Block Address system, and corresponds to such a system for determining a position of data which should be stored by employing logical sectors in which numbers are applied to all of sectors. It should also be noted that in this embodiment mode 1, the LBA system is employed.

As previously explained, in this embodiment mode 1, it is so assumed that the above-described logic block address system is employed as the area managing method for managing the storage areas of the hard disk drive (HDD) 207.

As shown in FIG. 2, in the digital multifunction machine, the image data of the original 2 read out by the image reading apparatus 4 provided on the upper portion of the main body 1 of the digital multifunction machine, or the image data transmitted via the network such as a LAN by the network control unit 108 is processed so as to be converted into a printable format, and thereafter, the processed image data is once stored in the hard disk drive (HDD) 109 provided in the image processing apparatus 12 under control of the CPU 101, as represented in FIG. 4.

In this case, as a control operation of the CPU 101 of the digital multifunction machine, as indicated in FIG. 1 of the functional block diagram, the job control unit 202 accepts a job such as a printing operation based upon the image data. As a result, when the job control unit 202 accepts the job such as the printing operation based upon the image data in a step 401 of FIG. 6, the job control unit 202 judges as to whether or not the hard disk drive (HDD) 207 is operated under deleting operation of the image data (step 402). Then, when the above-described job control unit 202 judges that the hard disk drive (HDD) 207 is not operated under deleting operation of the image data, namely in the below-mentioned cases, the job control unit 202 executes a writing process operation of the accepted job (step 404). That is, as shown in FIG. 7A, in the case that no image data is stored in the storage area of the hard disk drive (HDD) 207, or as shown in FIG. 7B, in the case that even when the image data is stored in the storage area of the hard disk (HDD) 207, this image data need not be erased, the job control unit 207 judges that the hard disk drive (HDD) 207 is not operated under deleting operation of the image data.

Also, as shown in FIG. 7C, in such a case that the job control unit 202 judges that the image data of the previous first job has been stored in the storage area of the hard disk drive (HDD) 207, and the hard disk drive (HDD) 207 is operated under deleting operation for the image data of the first job, the job control unit 202 stops an issue of a deleting instruction to the data erase control unit 205, and interrupts the deleting operation (step 403), and thereafter executes a writing operation of a job (step 404). This job writing operation is carried out in accordance with a sub-program of the job writing process operation (will be explained later).

Next, the job control unit 202 reads out the image data stored in the hard disk drive (HDD) 207, and then, outputs the read image data via the image output control unit 106 to the printer 50. After, a printing process operation is carried out by this printer 50 (step 405), as explained later, the job control unit 202 executes an updating process operation of a deleting area (step 406). Then, after the job control unit 202 judges as to whether or not a deleting subject area is present in the hard disk drive (HDD) 207 (step 407), in such a case that the deleting subject area is not present in the hard disk drive (HDD) 207, the job control unit 202 directly accomplishes operations of the basic process sequence. On the other hand, in such a case that the deleting subject area is present in the hard disk drive (HDD) 207, the job control unit 202 executes the deleting process operation (step 408).

FIG. 8 is a flowchart for indicating the sub-program as to the job writing process operation contained in the above-described basic process operation.

Figure 9A:
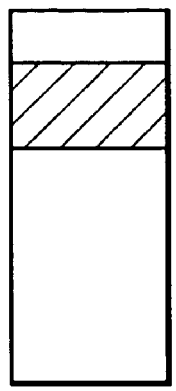
FIGS. 9A and 9B are explanatory diagrams for explaining a storage area of the hard disk drive.
Figure 9B:
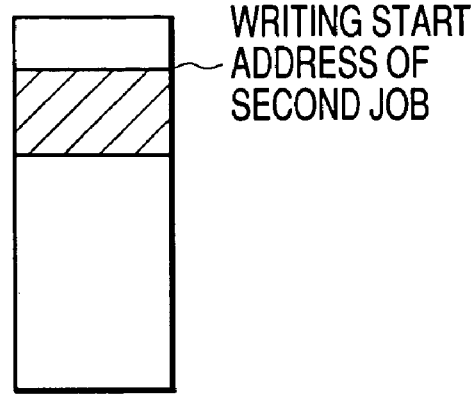

As indicated in FIG. 8, the above-explained writing area information managing unit 203 judges as to whether or not a deleting subject area is present (step 501). Now, in such a case that such a deleting subject area is present, the writing area information managing unit 203 sets a writing start address to a head address of a deleting area (step 502). In the embodiment mode 1, FIGS. 9A and 9B presently indicate such a condition that the image data of the first job has been stored in the storage area of the hard disk drive (HDD) 207, and the image data of the first job is being erased. In this case, since the deleting subject area of the hard disk drive (HDD) 207 is present, as indicated in FIG. 9B, a writing start address of image data of a second job (next job) is set to a head address of the deleting area.

Figure 10A:
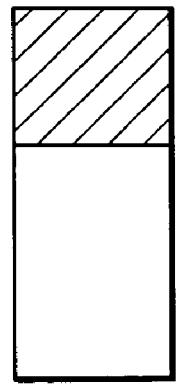
FIGS. 10A and 10B are explanatory diagrams for indicating a storage area of the hard disk drive.
Figure 10B:
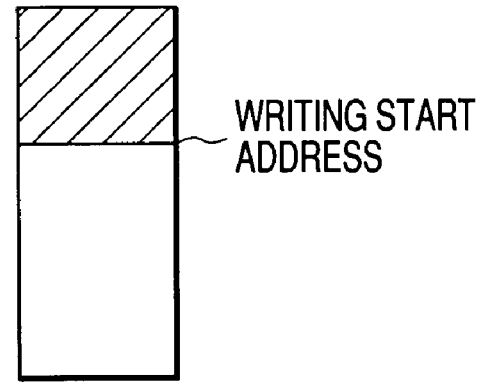

On the other hand, in the case that the deleting subject area is not present, a writing start address is set to an address subsequent to the previous writing end address (step 503). Now, in the embodiment mode 1 shown in FIGS. 10A and 10B, although the image data of the first job has been stored in the storage area of the hard disk drive (HDD) 207, in such a case that the image data of this first job corresponds to image data having a low secret level which is not required to be erased, the writing start address is set to an address subsequent to the previous writing end address.

Subsequently, the writing area information managing unit 203 writes the job data in the hard disk drive (HDD) 207 from the writing start address which has been determined as explained above (step 504), and thereafter, updates the writing end address (step 505), so that the job writing process operation is accomplished.

FIG. 11 is a flow chart for indicating a sub-program as to the deleting area operating process operation contained in the above-described basic process operation.

As indicated in FIG. 11, the above-explained deleting area information managing unit 204 judges as to whether or not a writing end address is larger than, or equal to the deleting end address (step 601). In the case that a writing end address of a second job is larger than, or equal to a deleting end address of the preceding operation, the deleting area information managing unit 204 judges as to whether or not this second job is designated as a secret job (step 602). Then, in such a case that the second job is not designated as the secret job, the deleting area information managing unit 204 clears a deleting subject area (step 603), and then accomplishes this deleting area updating process operation. In such a case that the second job is designated as the secret job, the deleting area information managing unit 204 sets the deleting subject area from a start address of the second job until an end address (step 604), and then, accomplishes the deleting area updating process operation.

In an embodiment mode shown in FIG. 12A and FIG. 12B, since a writing end address of a second job which has been written in the storage area of the hard disk drive (HDD) 207 is larger than, or equal to a deleting end address, namely the writing end address of the preceding first job, the deleting operation of the image data of the first job is ended, and the deleting area information managing unit 204 judges as to whether or not a next second job is designated as a secret job. In the case that the second job is not designated as the secret job, since the deleting subject area need not be erased, the deleting area information managing unit 204 clears the deleting subject area (step 603), and then accomplishes this deleting area updating process operation.

On the other hand, in such a case that the next second job is designated as the secret job, as represented in FIG. 12C, since the deleting subject area need be erased, the deleting area information managing unit 204 sets the deleting subject area from a start address of the second job up to an end address (step 604), and then accomplishes this deleting area updating process operation.

Also, in such a case that the writing end address is not larger than, or equal to the deleting end address, namely in such a case that the writing end address is smaller than the deleting end address, the deleting area information managing unit 204 judges as to whether or not the second job is designated as the secret job (step 605). In the case that the second job is not designated as the secret job, the deleting area information managing unit 204 sets the start address of the deleting subject area to an end address of the second job (step 606), and thus, accomplishes this deleting area updating process operation. Also, in the case that the second job is designated as the secret job, the deleting area information managing unit 204 sets the start address of the deleting subject area to a start address of the second job (step 607), and thus, accomplishes this deleting area updating process operation.

In an embodiment mode shown in FIGS. 13A to 13C, since a writing end address of a second job which has been written in the storage area of the hard disk drive (HDD) 207 is smaller than a deleting end address, namely the writing end address of the preceding first job, the deleting operation of the image data of the first job is not yet ended, and the deleting area information managing unit 204 judges as to whether or not a next second job is designated as a secret job. In the case that the second job is not designated as the secret job, since the deleting subject area need not be erased, the deleting area information managing unit 204 sets the start address of the deleting subject area to an end address of the second job (step 606), and thus, accomplishes this deleting area updating process operation.

Also, in the case that the second job is designated as the secret job, as shown in FIG. 13C, the deleting area information managing unit 204 sets the start address of the deleting subject area to a start address of the second job (step 607), and thus, accomplishes this deleting area updating process operation. At this time, the deleting end address is not updated.

FIG. 14 is a flow chart for describing a sub-program of a deleting process operation.

As indicated in FIG. 14, the data deleting unit 205 sets both a deleting start address and a deleting size of a deleting subject area (step 701), and executes a deleting process operation (step 702). In this case, setting of the deleting size is carried out by being set to such a size that an entire deleting area is subdivided into a small area in order that a job can be accepted even during a deleting operation. Also, the deleting process operation is carried out in such a manner of writing such a value "0×00" or "0×ff" to the deleting subject area. Next, the above-described data deleting unit 205 updates a deleting start address (step 703), and also, judges as to whether or not a deleting interrupt instruction is issued (step 704). In the above-described step 703, since the deleting operation of the small area is accomplished, an updating operation of the deleting area is carried out, namely a start address of the deleting area is updated. Then, in such a case that the deleting interrupt instruction is issued, the data deleting unit 205 ends this deleting process operation at once. To the contrary, in such a case that the deleting interrupt instruction is not issued, the data deleting unit 205 judges as to whether or not the deleting operation for all of the deleting areas is accomplished (step 705). In such a case that the deleting operation for all of the deleting areas is accomplished, the data deleting unit 205 accomplishes this deleting process operation at once, whereas in the case that the deleting operation for all of the deleting areas is not yet accomplished, the process operation is returned to the previous step 701.

Furthermore, operations of the image processing apparatus according to this first embodiment will now be explained with reference to FIG. 15.

Now, when the job control unit 202 accepts a first job, the secret level of which is high, as shown in FIG. 15, the job control unit 202 writes the image data of this first job into a storage area of the hard disk drive (HDD) 207, and thereafter, the job control unit 202 executes a printing process operation based upon the image data of the first job stored in this hard disk drive (HDD) 207, so that the first job is accomplished.

Under this condition, in such a case that the job control unit 202 does not receive an instruction of a next job, the data deleting control unit 205 executes a deleting operation by overwriting such a value as "0×00" and "0×ff" to the image data of the first job. While this deleting operation is carried out, when the job control unit 202 accepts the next job, namely a second job, the job control unit 202 interrupts the deleting operation as indicated in a step 403 of FIG. 15 and FIG. 8.

Then, as indicated in FIG. 15, the job control unit 202 commences a writing operation of the image data of the second job from a storage area of the hard disk drive (HDD) 207 subsequent to the storage area where the deleting operation was interrupted, and accomplishes this second job.

In such a case that the secret level of this second job has been set to a high secret level, the job control unit 202 causes the data deleting control unit 205 to commence the deleting operation of the image data of the second job. Thereafter, in the case that the job control unit 202 similarly accepts a next job, namely a third job while the deleting operation of the image data of the second job is carried out, the job control unit 202 interrupts the deleting operation of the image data of the second job, and then, overwrites the image data of the third job into such a storage area subsequent to the storage area when the deleting operation of the image data is interrupted.

In this case, a writing area of the hard disk drive (HDD) 207 is managed by the writing area information managing unit 203.

Next, after the first job whose secret level is high has been accomplished as explained above, as shown in FIG. 15, the data deleting unit 205 commences the deleting operation of the image data of the first job. Then, when the job control unit 202 accepts a next job, namely, a second job while executing the deleting operation, this data deleting control unit 205 interrupts the deleting operation, and then, commences to overwrite the image data of the second job from a storage area subsequent to the previous storage area. At this time, in such a case that the image data of the second job which is overwritten is smaller than the deleting subject area, the below-mentioned process operations will be carried out in response to the secret level of the second job.

In case that second job is not designated as secret job:

The job control unit 202 judges as to whether or not the image data of the second job which will be overwritten is smaller than the deleting subject area by checking as to whether or not a writing end address is larger than, equal to the deleting end address as indicated in the step 601 of FIG. 11. Then, in such a case that the image data of the second job which will be overwritten is smaller than the deleting subject area, and further, the second job is not designated as the secret job, the job control unit 202 sets the start address of the deleting subject area to an end address of the second job (step 606). With respect to an unerased storage area subsequent to the image data of the second job, the data deleting control unit 205 performs a deleting operation of the remaining image data of the first job.

In case that secret level of second job is higher than, or equal to secret level of first job:

After the job control unit 202 has erased an unerased storage area of the image data of the first job, as indicated in the step 607 of FIG. 11, the job control unit 202 sets the start address of the deleting subject area to a writing start address of the image data of the second job corresponding to the deleting subject area, and then, the data deleting control unit 205 starts to erase the image data of the second job. Alternatively, the job control unit 202 holds the deleting operation of the image data of the first job, and commences a deleting operation from a head of the second job. At this time, the job control unit 202 executes a deleting operation up to a final area of the first job.

Also, in such a case that the job control unit 202 accepts the normal image data whose secret level is not designated, the data deleting control unit 205 does not perform the deleting operation. At this time, only the writing start address and the writing end address are updated by the writing area information managing mean 203.

In this second embodiment, the image processing apparatus is characterized in that in the case that a secret level of the first job is the highest secret level, the job control unit does not commence a process operation of a second job until the deleting operation of the image data of the first job by the data deleting control unit is accomplished.

Furthermore, in the embodiment mode 2, in the case that the secret level of the first job is the highest secret level, the data deleting control unit erases the deleting area of the image data of the first job plural times.

Also, in this embodiment mode 2, the image processing apparatus further includes an operation condition changing unit that changes an operation condition of the image processing apparatus in response to information of the deleting area managing unit.

Figure 16:
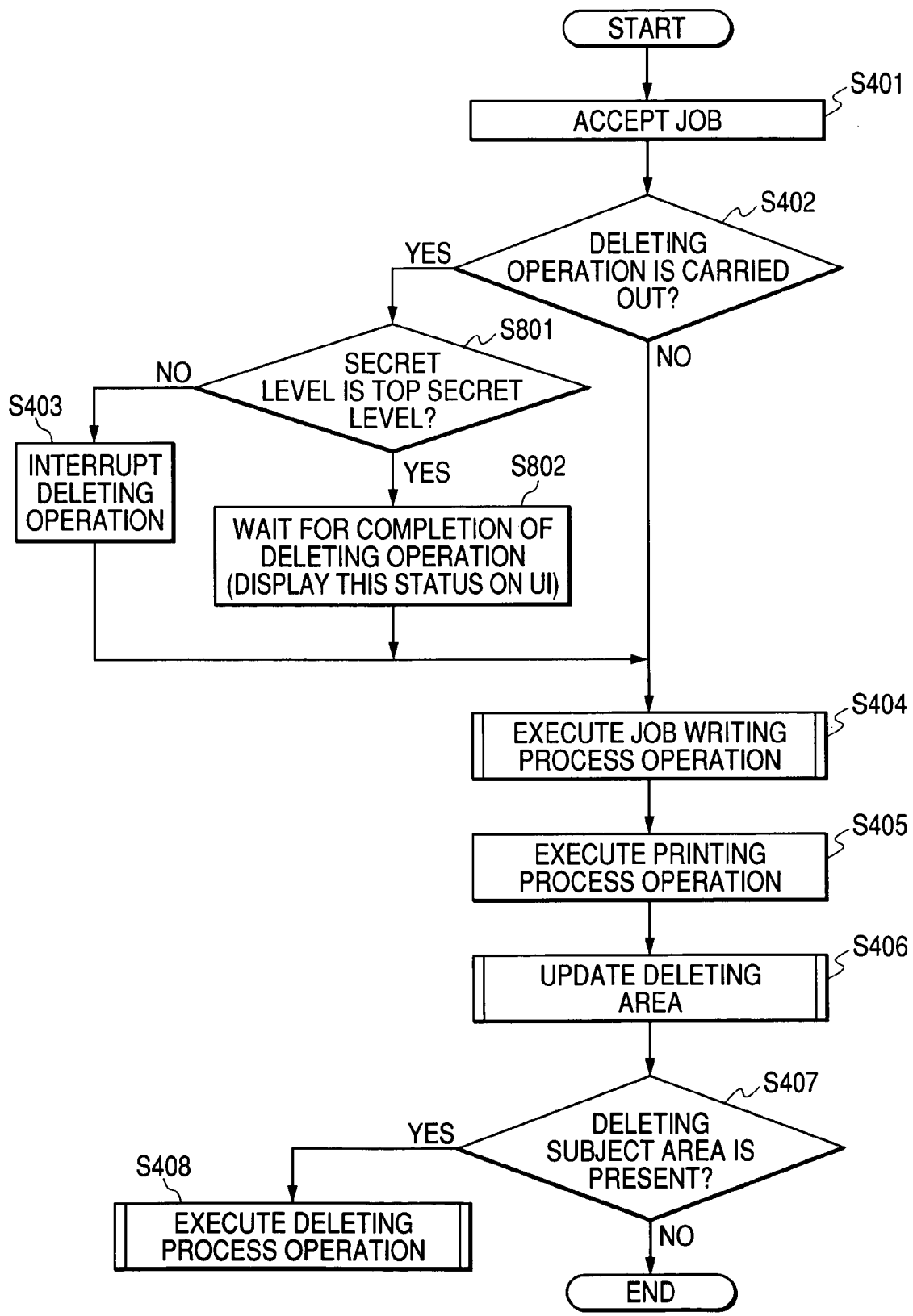
FIG. 16 is a flow chart for describing operation of the image processing apparatus according to an embodiment mode 2 of the present invention.

FIG. 16 illustratively shows an image forming operation to which an image processing apparatus according to an embodiment mode 2 of the present invention has been applied. It should be noted that the same reference numerals shown in the above-described embodiment mode 1 will be employed as those for denoting the same structural elements of the embodiment mode 2. This second embodiment mode 2 is arranged in such a manner that when image data is accepted whose secret level has been set to the very high secret level in a basic process sequence, a deleting operation as to the image data whose secret level has been set to the very high secret level is carried out in a top priority while either a deleting subject area or a next job is not accepted.

In other words, in this embodiment mode 2, as indicated in FIG. 16, the job control unit 202 judges as to a deleting operation of a job is carried out (step 402). When the job control unit 202 judges that the deleting operation of the job is carried out, the job control unit 202 judges as to whether or not a secret level of the job under the deleting operation is the top secret level (step 801). In such a case that the job control unit 202 judges that the secret level of the job under the deleting operation corresponds to the top secret level, the job control unit 202 displays such a message "waiting for end of deleting operation" on the user interface without accepting either a deleting subject area or a next job, and then, the data deleting control unit 205 executes a deleting operation of the image data whose secret level has been set the top secret level in a top priority (step 802). Alternatively, the job control unit 202 may cause the data deleting control unit 205 to execute the deleting operation of the image data whose secret level has been set to the top secret level plural times so as to firmly perform the deleting operation of the image data whose secret level has been set to the top secret level. At this time, it is preferable that the data deleting control unit 205 may set or select a deleting system. For instance, the deleting system changes data written to the deleting subject area.[0094]

Figure 17:
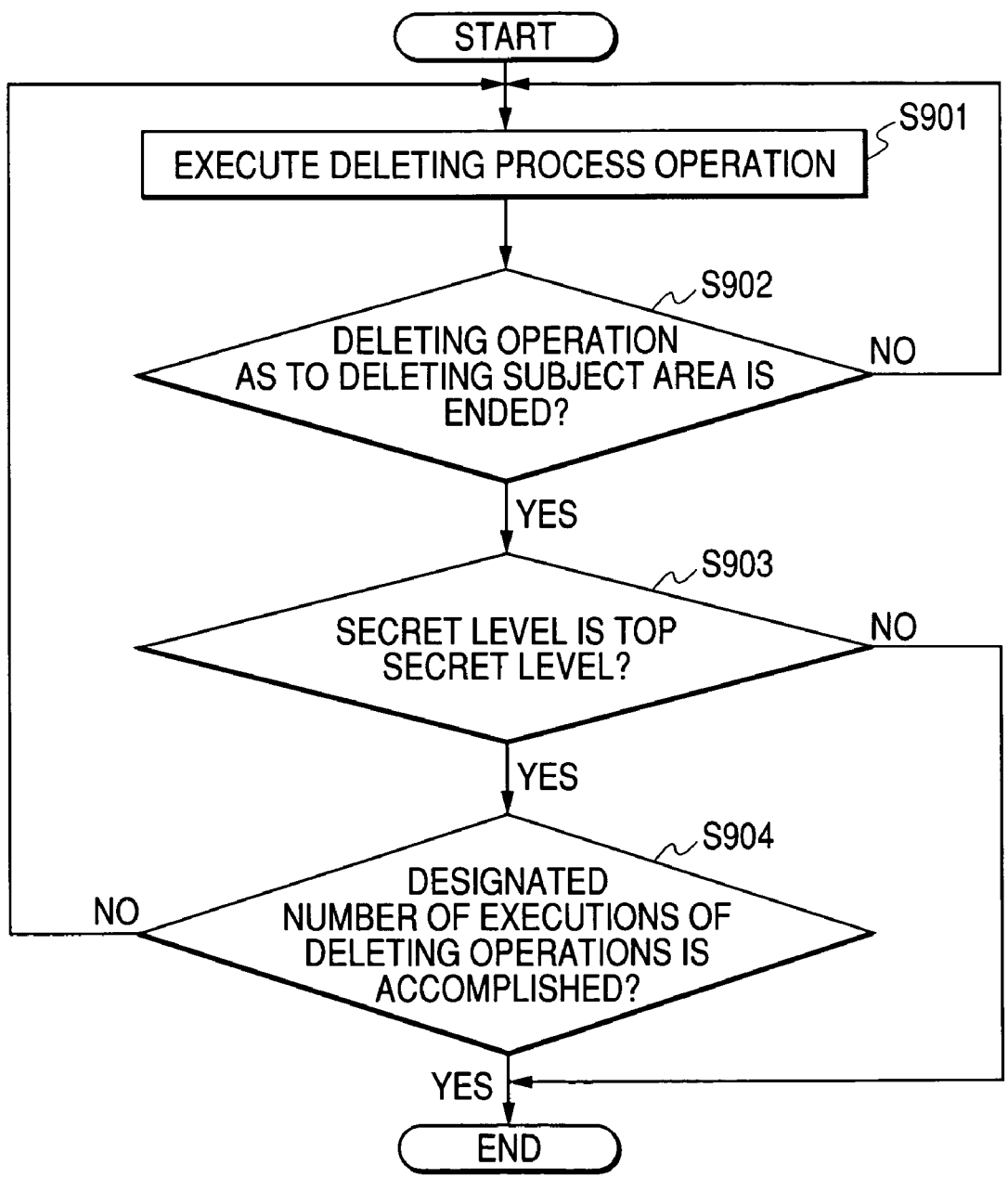
FIG. 17 is a flow chart for describing operation of the image processing apparatus according to the embodiment mode 2 of the present invention.

Also, in this embodiment mode 2, as shown in FIG. 17, although the job control unit 202 executes the deleting process operation (step 901), this job control unit 202 judges as to whether or not the deleting process operation as to a deleting subject area is accomplished (step 902). In such a case that the deleting process operation is ended, the job control unit 202 judges as to whether or not a secret level of such a job whose deleting processing operation has been ended corresponds to the top secret level (step 903). In the case that this level of the job is not equal to the top secret level, the job control unit 202 accomplishes this deleting process operation.

Also, in such a case that the job control unit 202 judges that the secret level of the job whose deleting process operation has been ended corresponds to the top secret level, the job control unit 202 judges as to whether or not a designated number of executions of the deleting process operations has been accomplished (step 904). In such a case that the designated number of the executions of this deleting process operations has not yet been accomplished, the process operation is returned to the previous step 901 in which the job control unit 202 executes a deleting process operation.

As previously explained, since the deleting process operation with respect to the hard disk drive (HDD) 207 is repeatedly carried out only by the designated number, such an operation that the data is analyzed from residual magnetism of the hard disk drive (HDD) 207 can be firmly prevented, and also, the data having the very high secrecy can be firmly erased.

It should be understood that the writing data, designated time, and the like, which are required to erase the data stored in the hard disk (HDD) 207 may be preferably set in an arbitrary manner.

Since other structures and effects are identical to those of the above-described embodiment mode 1, descriptions thereof are omitted.

FIG. 18 illustratively shows an image forming operation to which an image processing apparatus according to a third embodiment of the present invention has been applied. It should be noted that the same reference numerals shown in the above-described embodiment mode 1 will be employed as those for denoting the same structural elements of the embodiment mode 3. This third embodiment mode 3 is arranged in such a manner that an operation status changing unit is provided, while the operation status changing unit changes an operation status of an image processing apparatus in response to information of a deleting area managing unit.

That is to say, in this embodiment mode 3, as shown in FIG. 18, when an appliance status changing unit accepts a changing request of an appliance status (step 1001), the appliance status changing unit judges as to whether or not a deleting subject area is present (step 1002). In the case that there is no deleting subject area, the appliance status changing unit executes a changing process operation of the accepted appliance status (step 1005), and then, this process operation is ended. In this case, the changing request of the appliance status indicates a transition request for a standby status, for instance, a power save mode and a sleep mode, a request of shut-down operation, or a request for turning OFF a power supply of an apparatus.

On the other hand, when the appliance status changing unit judges that the deleting subject area is present, the job control unit 202 outputs a message of "under deleting operation" so as to display this message on the user interface (step 1003), and waits for a completion of the deleting process operation (step 1006). After the deleting process operation is ended, the job control unit 202 executes a changing process operation of the accepted appliance status (step 1005).

As previously explained, when the power supply of the digital multifunction machine is turned OFF, when the digital multifunction machine is brought into the shut-down status, or in the case that the operation mode of the digital multifunction machine is advanced to a sleep (standby/power saving) mode, in order to avoid such a fact that data which should be originally erased is not erased, but is left, the appliance status changing unit judges as to whether or not unerased data is present before the power supply of the digital composite appliance is turned OFF, the operation of the digital composite appliance is brought into the shut-down status, or the operation mode of this digital multifunction machine is advanced to the sleep (standby/power saving) mode. In the case that the unerased data is present, the appliance status changing unit notifies such a message that the data is being erased to a user by employing the user interface (UI). After the data is completely erased, the job control unit 202 turns OFF the power supply, or executes the shut-down process operation.

Also, the digital multifunction machine is arranged in such a manner that even when the operation mode of this digital multifunction machine is advanced to the sleep mode, after the appliance status changing unit judges as to whether or not the unerased data is present, the operation mode of this digital multifunction machine is advanced to the sleep mode.

The invention of another aspect is the image processing program characterized in that the image processing program further includes job controlling to manage a job of an image processing operation executed based upon the image processing program. Preferably, wherein the job controlling controls the deleting operation based upon a management of the deleting area by the managing and an accept condition of a next job by the job controlling.

The invention of yet another aspect is the image processing program characterized in that in the image processing program, when the controlling the deleting operation executes a second job while image data of a first job is being erased, the controlling the deleting operation interrupts the deleting process operation, and successively overwrites image data of the second job in an area on the non-volatile storage apparatus, the area being to be erased.

The invention of still another aspect is the image processing program characterized in that in the image processing program, when an unerased portion of the first job is left after a writing operation of the image data of the second job is accomplished, the controlling the deleting operation executes the deleting process operation of the unerased portion.

The invention of still another aspect is the image processing program characterized in that in the image processing program, the controlling the deleting operation determines the deleting area based upon both the secret level entered by the inputting the secret level and information used to manage the writing area.

The invention of still another aspect is the image processing program characterized in that in the image processing program, when a judgement is made that a secret level of the second job entered by the inputting the secret level is equal to, or higher than a secret level of the first job which has been executed in advance, a deleting operation of the second job is executed with a top priority, even when the deleting area of the first job is left.

The invention of still another aspect is the image processing program characterized in that in the image processing program, in the case that a secret level of the first job is the highest secret level, the controlling the deleting operation does not commence a process operation of the second job until the deleting operation of the image data of the first is accomplished.

The invention of still another aspect is the image processing program characterized in that in the image processing program, in the case that the secret level of the first job is the highest secret level, the controlling the deleting operation erases the deleting area of the image data of the first job plural times.

The invention of still another aspect is the image processing program characterized in that in the image processing program, when an operating condition of the image processing program is changed, the data deleting operation is executed with a top priority.

Since other structures and effects are identical to those of the above-described embodiment modes 1 and 2, descriptions thereof are omitted.

What is claimed is:

1. An image processing apparatus comprising:
   an image input unit that inputs image data of a job;
   a storage unit that stores the image data inputted by the image input unit;
   an image output unit that reads the image data from the storage unit to output the read image data;
   a job controller that controls a job for executing a process operation in the image processing apparatus; and
   a data deleting controller that interrupts a deleting process operation of image data of a first job stored in the storage unit and successively overwrites at least part of the image data of the first job with image data of a second job when the job controller executes the second job while image data of the first job is being erased.

2. The image processing apparatus as claimed in claim 1, wherein when an unerased portion of the image data of the first job is left after a writing operation of the image data of the second job is accomplished, the data deleting controller executes the deleting process operation of the unerased portion.

3. An image processing method comprising:
   inputting image data of a job;
   storing the inputted image data;
   outputting the stored image data;
   controlling a job for executing a process operation; and
   when executing a second job while image data of a first job is being erased, interrupting a deleting process operation of stored image data and successively overwriting at least part of the image data of the first job with image data of the second job.

4. The image processing method as claimed in claim 3, further comprising:
   when an unerased portion of the image data of the first job is left after a writing operation of the image data of the second job is accomplished, executing the deleting process operation of the unerased portion.

* * * * *